(12) United States Patent
Asadu

(10) Patent No.: US 7,542,571 B2
(45) Date of Patent: Jun. 2, 2009

(54) TRANSMITTING SECOND CONTENT DATA WITH REFERENCE FOR USE WITH FIRST CONTENT DATA

(75) Inventor: Hideki Asadu, Tokyo (JP)

(73) Assignee: Sony Corporation, Tokyo (JP)

( * ) Notice: Subject to any disclaimer, the term of this patent is extended or adjusted under 35 U.S.C. 154(b) by 979 days.

(21) Appl. No.: 10/380,035

(22) PCT Filed: Sep. 12, 2001

(86) PCT No.: PCT/JP01/07924

§ 371 (c)(1),
(2), (4) Date: Nov. 3, 2003

(87) PCT Pub. No.: WO02/23903

PCT Pub. Date: Mar. 21, 2002

(65) Prior Publication Data

US 2004/0078336 A1    Apr. 22, 2004

(30) Foreign Application Priority Data

Sep. 12, 2000    (JP) .............................. 2000-277177

(51) Int. Cl.
*H04L 9/00* (2006.01)
(52) U.S. Cl. ................ 380/277; 380/200; 380/278; 380/279; 713/164; 713/168; 713/176
(58) Field of Classification Search ............... 380/277; 705/51
See application file for complete search history.

(56) References Cited

U.S. PATENT DOCUMENTS

| | | | |
|---|---|---|---|
| 5,765,152 A | 6/1998 | Erickson | |
| 5,991,399 A | 11/1999 | Graunke et al. | |
| 5,999,629 A | 12/1999 | Heer et al. | |
| 6,035,304 A | 3/2000 | Machida et al. | |
| 6,513,118 B1 | 1/2003 | Iwamura | |
| 6,801,999 B1 * | 10/2004 | Venkatesan et al. | ......... 713/167 |
| 6,827,196 B2 | 12/2004 | Wiesinger et al. | |

FOREIGN PATENT DOCUMENTS

| | | |
|---|---|---|
| EP | 0 817 105 | 1/1998 |
| EP | 0 932 298 | 7/1999 |
| JP | 8-340525 | 12/1996 |

(Continued)

*Primary Examiner*—KimYen Vu
*Assistant Examiner*—Yogesh Paliwal
(74) *Attorney, Agent, or Firm*—Frommer Lawrence & Haug LLP; William S. Frommer

(57) ABSTRACT

Usage by second content of previously distributed first content, is permitted if the proper electronic signature is incorporated into predetermined data added to the second content. A secret key and a public key are generated for the first content. The public key is added to the first content which is transmitted. When the second content seeks to refer to the first content, an electronic signature, produced by employing the secret key, is requested and incorporated into predetermined data that is added to the second content. The second content with the predetermined data is transmitted. At the receiver, the public key which was added to the first content, is used in a collating process with the received electronic signature, and when the collation succeeds, the previously received first content stored at the receiver is used in accordance with instructions received with the second content.

6 Claims, 16 Drawing Sheets

FOREIGN PATENT DOCUMENTS

| | | |
|---|---|---|
| JP | 10-13811 | 1/1998 |
| JP | 10-290443 | 10/1998 |
| JP | 11-96064 | 4/1999 |
| JP | 11-212462 | 8/1999 |
| JP | 2000 155735 | 6/2000 |
| JP | 2000-155735 | 6/2000 |
| KR | 2000 24217 | 5/2000 |
| WO | WO 98 42098 | 9/1998 |
| WO | WO 00 14918 | 3/2000 |

\* cited by examiner

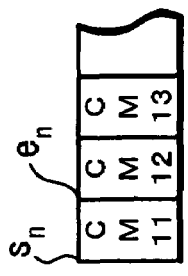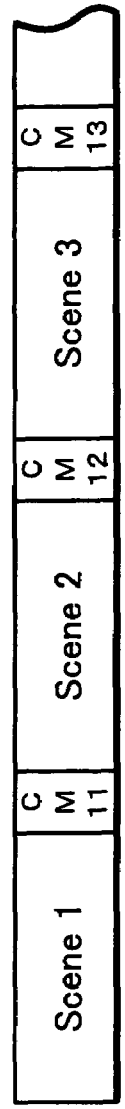
FIG. 10A  Content A
FIG. 10B  Content B
FIG. 10C  Video Output

TRANSMITTING SECOND CONTENT DATA WITH REFERENCE FOR USE WITH FIRST CONTENT DATA

This is a National Phase Application from International Application PCT/JP01/07924 having the international filing date of Sep. 12, 2001, with a claim of priority under 35 USC 119 to Japanese Application No. 2000-277177, filed in Japan Sep. 12, 2000, the entirety of which is incorporated herein by reference.

TECHNICAL FIELD

The present invention relates to an information processing method for transmitting and receiving, for example, a content such as a program of a television broadcast, an information processing apparatus and an electronic device to which the information processing method is applied, and a medium which a program for executing the information processing method is stored in or transmitted to.

BACKGROUND ART

Conventionally, with respect to a television broadcast, when the broadcast is received, a program of the broadcast is watched or listened to in real time by an image receiver connected to (or integrally formed with) a receiving device receiving the broadcast, or the program is once recorded by a recording/reproducing apparatus such as a video tape recorder so that the recorded tape or the like is reproduced at an arbitrary time to be watched or listened to.

In any case, conventionally, the received program is only watched or listened to basically as it is, and only a part can be jumped by fast forwarding or the like when the program is recorded on, for example, a video tape and is reproduced.

However, in recent years, according to improvement in performance or reduction in cost of a recording/reproducing apparatus in which a disk (a hard disk, an optical disk, an magneto-optical disk, or the like) is employed as a medium, it has become possible that a disk recording/reproducing apparatus is incorporated in a receiving device for broadcast signals so that the received data of a broadcast program is recorded in the incorporated disk recording/reproducing apparatus and a user reproduces the recorded program data at an arbitrary time.

When the disk recording/reproducing apparatus is employed, since an access to recorded arbitrary data is easy, it is possible to reproduce the data in an arbitrary mode based upon the operation of a user.

On the other hand, in the case of so called digital broadcast in which program data is transmitted from a broadcast station by way of digital data, it is possible to add and transmit various data along with content data that is data of a program content itself, and there has been considered that a reproduction mode of the content data recorded in a digital recording/reproducing apparatus is instructed by utilizing such added data.

For example, when a specific program (suppose it to be content A) is broadcasted, it is supposed that the content A is recorded by a recording device incorporated in a receiving device of a user. Thereafter, when another program (suppose it to be content B) is broadcasted, data which instructs a part of image or the like of the content A to be referred to at the time of watching or listening to the content B is sent from a broadcast station side to a user whose content A is stored in the receiving device, and based upon the data, for example, it is proposed that synthesizing and displaying the image of the content A and the image of the content B can be realized in a receiving device of each user. In the case where a display mode or the like is set according to an instruction based upon the data sent from the broadcast station side described above, basically a user does not need a special operation.

With this, it becomes possible to generate a new content in which contents broadcasted in the past are efficiently utilized, and a new usage mode concerning television broadcast or the like can be established.

However, when the content A broadcasted in the past is processed and utilized at the time of watching and listening to the other content B, there is a risk that the right of the producer or broadcast manufacturer of the content A is infringed. Thus, when such a stored past content is utilized, certain processing such as providing some restriction so as not to infringe a copyright owner or the like of the content A is needed.

Distributing the data of a contents list (an access control list) permitting the content A to be referred to, when the content A is broadcasted, has already been proposed as processing of restricting the usage of past contents, for example. However, there is a problem that predicting how the content A will be utilized in another content in the future is difficult at the time when the content A is broadcasted, and forming data of a complete list of contents which can refer to content A when the content A is distributed is difficult.

Consequently, though it may be possible to keep updating the access control list of the content in the future, it is not practical to manage and update the access control list of an individual content distributed in the past separately, considering management cost or the like.

DISCLOSURE OF INVENTION

Considering such circumstances, the object of the invention is to make the usage restriction of a past distributed content efficiently function when processing in which another content refers to the past content is performed.

A first invention is that an information processing apparatus for giving/receiving information via a network comprises;

key management means for generating and managing a secret key and a public key for the first content, first transmission means for adding the public key managed in the key management means to the first content and transmitting the first content, and second transmission means for requesting an electronic signature, by the secret key that the key management means manages, on predetermined data added to the second content and transmitting the second content to which the electronically signed predetermined data is added.

With the implementation described above, since the predetermined data to which a correct electronic signature is given is added to the second content only when the reference is allowed by the administrator of the first content, another content automatically refers to the first content only when another content allowed to refer to the first content is received in the equipment of each receiver side in which the first content is stored. Accordingly, while the right of the producer or broadcast manufacturer of a past content is protected, a new content referring to the past content can be manufactured and distributed at an arbitrary time.

A second invention is that in the information processing apparatus of the first invention, the key management means executes electronic signature on the predetermined data only when it is judged that the reference to the first content by the second content does not infringe a predetermined right to the first content when the electronic signature is requested from the second transmission means.

Thus, only when the allowance is issued by the administrator of the past content, for example, it becomes possible to form another content utilizing part of a past specific content and let a viewer watch or listen to that content.

A third invention is that an information processing apparatus for giving/receiving information via a network comprises;

first transmission means combining a first content and predetermined data related to the first content with electronically signed data obtained by making an electronic signature on the predetermined data by employing a secret key applied to a second content to transmit the combined data. Thus, for example, when the first content is transmitted, it becomes possible to excellently transmit data permitting utilization of the second content which has been already broadcasted.

A fourth invention is that the information processing apparatus of the third invention has;

electronically-signed data acquisition means for acquiring the electronically signed data. With such configuration, for example, electronically signed data obtained by making an electronic signature can be acquired from a distance.

A fifth invention is that in the information processing apparatus of the third invention, the predetermined data on which the electronic signature is made by employing the secret key includes a command to refer to the second content. With such configuration, for example, when the first content is outputted, the second content is referred to without fail, and it is possible to prevent only the first content from being outputted.

A sixth invention is that in the information processing apparatus of the fifth invention, the predetermined data has insertion start position information and insertion end position information on the first content and reference start position information and reference end position information on the corresponding second content. With such configuration, insertion of the first content into the second content is performed at a determined position.

A seventh invention is an electronic device comprising;

reception means for receiving content data, content storing means for storing a content that the reception means receives, collation means for collating an electronic signature of predetermined data added to a second content that the reception means receives by employing key data added to a first content stored in the content storing means, content processing means for processing the first content stored in the content storing means based on an instruction at the second content when the collation in the collation means succeeds, and content output means for outputting a content processed in the content processing means. With such configuration, only when a content allowed to refer to the first content is received, another content automatically refers to the first content. Accordingly, while the right of the producer or broadcast manufacturer of a past content is protected, a new content referring to the past content can be manufactured and distributed at an arbitrary time.

An eighth invention is that in the electronic device of the seventh invention, the processing in the content processing means is synthesizing video or audio of the first content and video or audio of the second content. With such configuration, only when the allowance is issued by the administrator of the past content, for example, it becomes possible to synthesize video or audio of a past specific content and video or audio of a content transmitted later so that the synthesized part can be watched or listened to.

A ninth invention is that in the electronic device of the seventh invention, the processing in the content processing means is replacing part of video or audio of the first content with video or audio of the second content. With such configuration, only when the allowance is issued by the administrator of the past content, for example, it becomes possible to replace a part of video or audio or the like of a past specific content with updated data so that the replaced part can be watched or listened to.

A tenth invention is that in the electronic device of the seventh invention, the processing in the content processing means is editing video or audio of the first content according to an instruction by the second content. With such configuration, only when the allowance is issued by the administrator of the past content, for example, it becomes possible to display only highlight scenes of a past specific content.

An eleventh invention is that an electronic device for giving/receiving information via a network to record and/or reproduce the information comprises;

first reception means for receiving the combined data of a first content, first predetermined data related to the first content, and electronically signed data generated by employing a secret key applied to a second content for the first predetermined data. With such configuration, for example, when the first content is received, it becomes possible to excellently receive data permitting utilization of the second content which has been already broadcasted.

A twelfth invention is that in the electronic device of the eleventh invention, the first predetermined data on which the electronic signature is made by employing the secret key includes a command to refer to the second content. With such configuration, when the first content is received, the second content is reliably referred to.

A thirteenth invention is that in the electronic device of the twelfth invention, the first predetermined data has insertion start position information and insertion end position information on the first content and reference start position information and reference end position information on the corresponding second content. With such configuration, insertion of the first content into the second content is performed at a determined position.

A fourteenth invention is that the electronic device of the eleventh invention comprises;

second reception means for receiving the second content and a public key corresponding to the secret key and storing means for storing the received second content and the public key. With such configuration, processing can be performed utilizing the second content and the public key stored in the storing means.

A fifteenth invention is that the electronic device of the fourteenth invention comprises;

decoding means for decoding the electronically signed data by employing the public key to generate decoded data, data conversion means for converting the first predetermined data into the second predetermined data based on a predetermined algorithm, and collation means for collating the decoded data generated by the decoding means with the second predetermined data converted by the data conversion means. With such configuration, only when the collation agreed, the stored second content can be utilized.

A sixteenth invention is that the electronic device of the fifteenth invention comprises;

reference means for referring to the second content stored in the storing means based on the first predetermined data at a predetermined timing when the collation result of the collation means agreed. With such configuration, referring to the second content can be reliably performed.

A seventeenth invention is that an information processing method for processing a first content and a second content referring to the first content comprises the steps of generating a secret key and a public key for the first content, adding the generated public key to the first content and transmitting the first content, requesting an electronic signature by the secret key on predetermined data added to the second content, and transmitting the second content to which the electronically signed predetermined data is added. With such configuration, since predetermined data correctly signed is added to the second content only when referring is permitted by the administrator of the first content, another content automatically refers to the first content only when content that is permitted to refer to the first content is received in the equipment of each receiving side storing the first content. Accordingly, while the right of the producer or broadcast manufacturer of a past content is protected, a new content referring to the past content can be manufactured and distributed at an arbitrary time.

An eighteenth invention is that the information processing method of the seventeenth invention comprises the steps of collating the electronic signature on the predetermined data by employing the public key added to the stored first content when the transmitted second content is received in a state where the transmitted first content is received and stored and giving predetermined processing to the stored first content to output it based on an instruction of the received second content when the collation succeeds. With such configuration, outputting the second content utilizing the first content that is received in the past can be performed excellently.

A nineteenth invention is that an information processing method for giving/receiving information via a network comprises the steps of making an electronic signature on predetermined data related to a first content by employing a secret key applied to a second content that is different from the first content and combining the electronically signed data obtained by making the electronic signature with the predetermined data to transmit the combined data when the first content and the predetermined data are transmitted. With such configuration, for example, when the first content is transmitted, it becomes possible to excellently transmit data permitting utilizing the second content which has been already broadcasted.

A twentieth invention is that the information processing method of the nineteenth invention comprises the steps of requesting the electronic signature by employing the secret key from the side managing the second content or the secret key and combining electronically signed data obtained based on the request with the predetermined data. With such configuration, for example, electronically signed data obtained by making an electronic signature at a distance can be acquired.

A twenty-first invention is that in the information processing method of the nineteenth invention, the predetermined data on which the electronic signature is made by employing the secret key includes a command to refer to the second content. With such configuration, for example, when the first content is outputted, the second content is always referred to, and outputting only the first content can be prevented.

A twenty-second invention is that in the information processing method of the twenty-first invention, the predetermined data has insertion start position information and insertion end position information on the first content and reference start position information and reference end position information on the corresponding second content. With such configuration, insertion of the first content into the second content is performed at a determined position.

A twenty-third invention is that an information processing method for giving/receiving information via a network to record and/or reproduce the information comprises the step of recording first predetermined data related to a first content and electronically signed data generated by employing a secret key applied to a second content which has already been recorded for the first predetermined data when the first content is recorded. With such configuration, data instructing the second content to be referred to can be recorded excellently.

A twenty-fourth invention is that in the information processing method of the twenty-third invention, the first predetermined data on which the electronic signature is made by employing the secret key includes a command to refer to the second content. With such configuration, for example, when the first content is outputted, the second content is always referred to, and outputting only the first content can be prevented.

A twenty-fifth invention is that in the information processing method of the twenty-third invention, the first predetermined data has insertion start position information and insertion end position information on the first content and reference start position information and reference end position information on the corresponding second content. With such configuration, insertion of the first content to the second content is performed at a determined position.

A twenty-sixth invention is that the information processing method of the twenty-third invention comprises the step of recording the received second content and a public key corresponding to the secret key when the second content and the public key are received. With such configuration, processing by utilizing recorded data of the public key and the second content can be reliably performed when the first content utilizing the second content is received.

A twenty-seventh invention is that the information processing method of the twenty-sixth invention comprises the steps of decoding the electronically signed data to generate decoded data by employing the public key, converting the first predetermined data into second predetermined data based on a predetermined algorithm, and collating the decoded data with the second predetermined data. With such configuration, only when the collation agrees, the stored second content can be utilized.

A twenty-eighth invention is that the information processing method of the twenty-seventh invention comprises the step of referring at a predetermined timing to the second content which has already been recorded based on the first predetermined data when the collation result agrees. With such configuration, referring to the second content can be reliably performed.

BRIEF DESCRIPTION OF DRAWINGS

FIGS. 10A, 10B and 10C are explanatory diagrams showing an example in which a past content is utilized (an example in which CMs are replaced) according to an embodiment of the present invention;

BEST MODE FOR CARRYING OUT THE INVENTION

An embodiment of the present invention will be explained below referring to FIG. 1 to FIG. 16.

Figure 1:
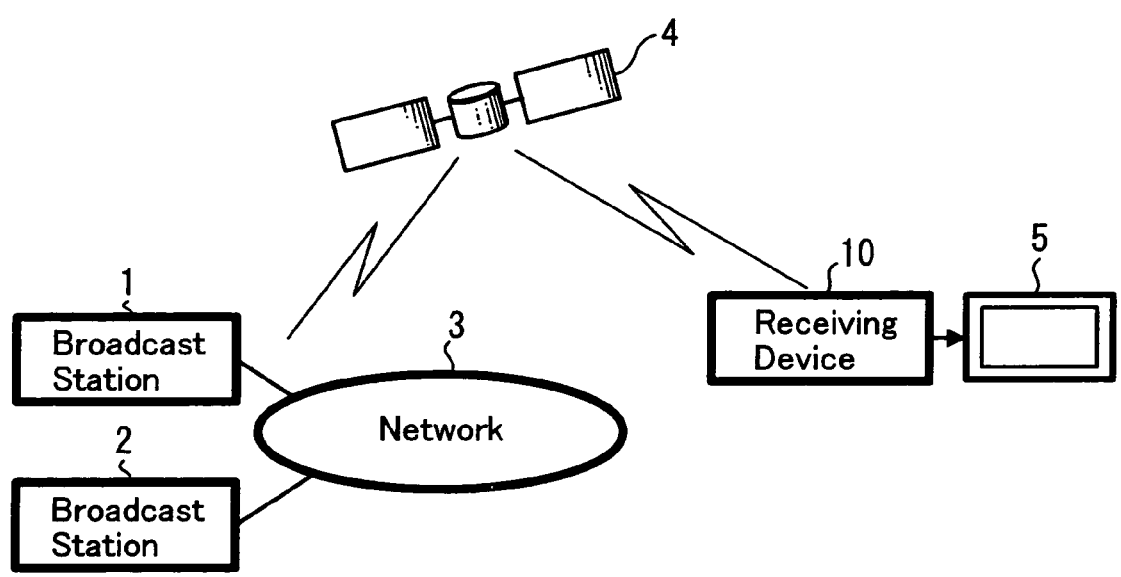
FIG. 1 is a structural diagram showing an example of the entire configuration of a broadcast system according to an embodiment of the present invention.

FIG. 1 is a diagram showing the entire configuration example of a broadcast system of the present embodiment. The present example is applied to a television broadcast system of satellite broadcasting, and here, a first broadcast station 1 and a second broadcast station 2 are prepared, and both the broadcast station 1, 2 are connected by a network 3. This network 3 may be any communication means, such as telephone line, exclusive use of communication line, and the like which can be applied thereto. Or a data transmission through the Internet or electronic mail may be utilized as the network 3.

The first broadcast station 1 and the second broadcast station 2 wirelessly transmit broadcast data to an artificial satellite 4 by a predetermined uplink, and the broadcast data is wirelessly transmitted by a downlink from the artificial satellite 4 to a receiving device 10 provided on each user side to thereby transmit various contents (programs) from the broadcast station 1, 2, for example by employing channels allocated to each broadcast station. Here, adopted is a structure in which received broadcast is watched or listened to by an image receiver 5 connected to the receiving device 10. The receiving device 10 of the present example incorporates a program recording/reproducing function performed by a hard disk. The receiving device 10 and the image receiver 5 may be integrally formed.

Figure 2:
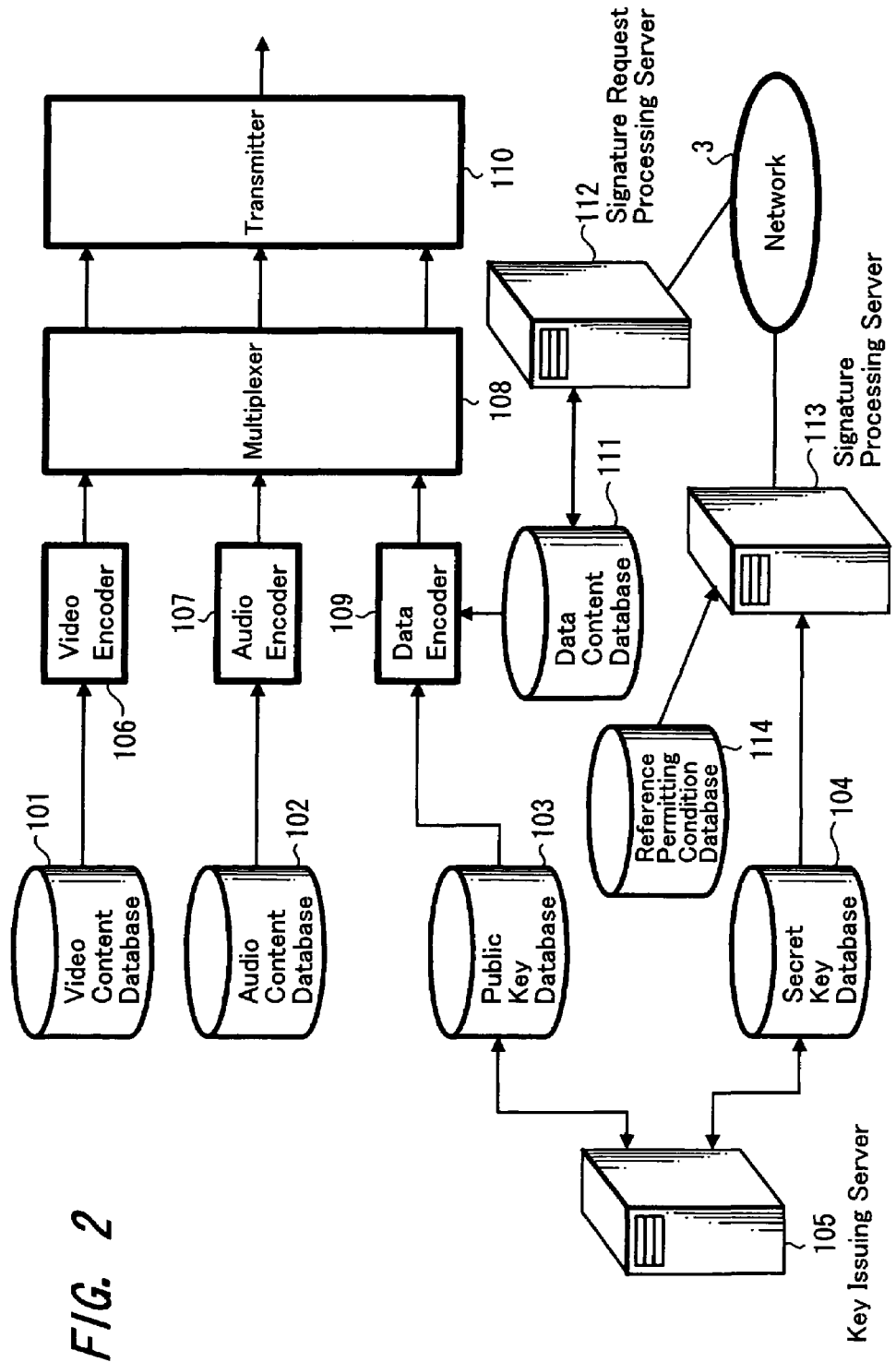
FIG. 2 is a block diagram showing an example of configuration of a broadcast station applied to a system according to an embodiment of the present invention.

FIG. 2 is a diagram showing a structural example of the broadcast station 1, 2 of the present embodiment. In the present embodiment, prepared as databases are a video content database 101, an audio content database 102, a public key database 103, a secret key database 104, a data content database 111, and a reference permitting condition database 114. A public key and secret key generated in a key issuing server 105 are stored in the public key database 103 and the secret key database 104 respectively.

Video/audio/data contents that become broadcast material are stored in the video content database 101 and the audio content database 102. Video content data outputted from the video content database 101 is encoded into an MPEG video stream packet in a video encoder 106 to be supplied to a multiplexer 108. An audio stream packet outputted from the audio content database 102 is encoded into an MPEG audio stream packet in an audio encoder 107 to be supplied to the multiplexer 108.

The multiplexer 108 multiplexes a video packet, audio packet and data supplied from a data encoder 109, and supplies it to a transmitter 110 to transmit the multiplexed data as broadcast data.

The data encoder 109 performs encoding processing for converting a data content supplied from a data content database 111 and a public key data supplied from the public key database 103 into an MPEG data packet to supply the processed MPEG data packet to the multiplexer 108.

In the reference permitting condition database 114, conditions under which referring to each content prepared in the broadcast station is permitted are registered. Conditions for permitting reference include, for example, a broadcast station, portion in a content whose reference is permitted/prohibited, a presenting method to be permitted/prohibited, a usage fee, and the like.

Data stored in the reference permitting condition database 114 and a secret key data held in the secret key database 104 are supplied to a signature processing server 113. When the signature processing server 113 is the broadcast station on the side requested to give an electronic signature (broadcast station 1 in the example of FIG. 5 described later), the server 113 makes an electronic signature on metadata received via the network 3 to transmit the electronically signed data to the transmission source of the metadata. A reference destination content, a reference position, and a presenting method are described in the metadata presented by the side requesting a signature (broadcast station 2 in the example of FIG. 5 described later), and when the described content corresponds to the reference permitting conditions which are set in advance and are stored in the reference permitting condition database 114, a signature is made on the metadata by employing the secret key held in the secret key database 104 so that the signed data is transmitted to the request source via the network 3.

When a signature request processing server 112 is the broadcast station on the side requesting a signature (broadcast station 2 in the example of FIG. 5 described later), the server 112 transmits the metadata through the network 3 to the broadcast station on the side requested to give a signature and receives the signed metadata via the network 3 so that the signed metadata is stored in the data content database 111.

Figure 3:
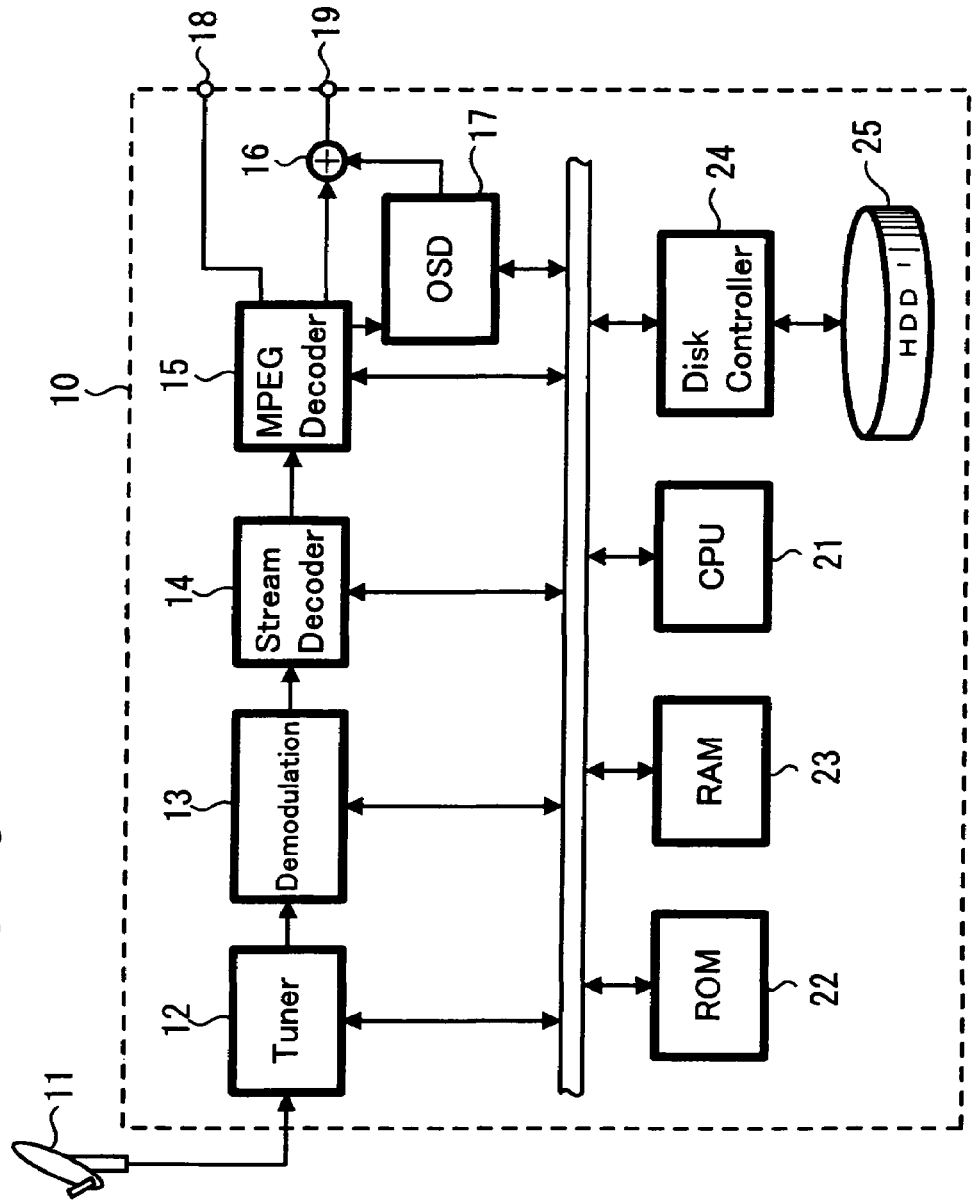
FIG. 3 is a block diagram showing an example of configuration of a receiving device applied to a system according to an embodiment of the present invention.

FIG. 3 is a diagram showing an example of configuration of the receiving device 10 of the present embodiment. The receiving device 10 is of a structure called a set top box or an IRD (Integrated Receiver Decoder). An antenna 11 receiving broadcast wave from the satellite 4 is connected to a tuner section 12 in the receiving device 10, and a predetermined channel instructed from a central control unit (CPU) 21 of the receiving device 10 is received in the tuner section 12. The signal received in the tuner section 12 (a base band signal or an intermediate frequency signal) is supplied to a demodulation section 13 so as to perform demodulation processing corresponding to the modulation mode of a transmitted signal. Specifically, the demodulation is performed according to a demodulation mode corresponding to a transmitted signal such as, for example, eight phase PSK demodulation, QPSK demodulation, 64 QAM demodulation, or the like.

The received signal demodulated by the demodulation section 13 is supplied to a stream decoder 14 to extract a digital data called a transport stream. At this time, the process separating various data multiplexed on the received data is performed so as to, for example, separate video data and audio data of the content constituting a program and further to separate various data which was added to the content and was transmitted. As one of data added to the content and transmitted there is data called a metadata. The metadata include data prescribing a display mode of the video data of a program constituting the content, an output mode of audio data, and the like. A key data described later on may be included in the metadata.

The video data and the audio data extracted in the stream decoder 14 are here provided as digital data compressed and coded by an MPEG (Moving Picture Experts Group) 2 mode and are supplied to an MPEG decoder 15 that decodes the video data and the audio data of the MPEG 2 mode, where decoding from the MPEG 2 mode is performed. The decoded video data is supplied to a video output section 19 after a processing of synthesizing the video data supplied from a synthetic image generating section 17 is performed in a synthesizing section 16 as the need arises, and the decoded video data is supplied to a video processing circuit in an image receiver (not shown) connected thereto. With respect to the data used for synthesizing, which is generated in the synthetic image generating section 17, data on displaying a letter, a numeral, a symbol, or the like superimposed on a main image called On Screen Display (OSD), as well as data capable of displaying various modes, such as data on performing a child screen display, a multi-image display, or the like can be generated. Data on synthesizing the video data of a content stored based upon the metadata described later on and the video data of a received content are also generated in the synthetic image generating section 17.

The audio data decoded in the MPEG decoder 15 is supplied from an audio output section 18 to an audio processing circuit of an image receiver (or an audio processing device such as a stereo reproducing device).

In the case where the image receiver or the like connected to the receiving device 10 is a device capable of inserting digital data, the output of the video output section 19 and the audio output section 18 are supplied as digital data, and in the case where a device only capable of inserting analog data is connected to the receiving device 10, analog conversion is necessary in the video output section 19 and the audio output section 18. The image receiver may be integrally formed with the receiving device 10.

So far each processing from the receiving of the broadcast signal to the output thereof is executed under the control of the central control unit (CPU) 21 that the receiving device 10 includes. The CPU 21 and each circuit in the receiving device 10 are connected by an internal bus. A ROM 22 in which a control program or the like is stored in advance and a RAM 23 which is a work RAM are connected via this internal bus.

The receiving device 10 of the present embodiment is further provided with a hard disk drive (HDD) 25 as a mass storage means for recording a received content or the like, and recording and reproducing of the data in the HDD 25 is implemented under the control of a disk controller 24 connected to the internal bus. For example, implemented is a processing in which the video data and audio data of predetermined content received and then extracted by the stream decoder 14 and the metadata thereof are recorded in a predetermined area of the HDD 25 under the control of the disk controller 24. The recorded data is read under the control of the disk controller 24, and the data regarding the video data and audio data is supplied to the MPEG decoder 15 to be decoded and thereafter is supplied to the connected image receiver or the like as data to be reproduced. The read metadata is supplied to the CPU 21 where decision is made as to control processing that is necessary to process the video data and audio data. The HDD 25 has, for example, several-tens gigabytes to several-hundreds gigabytes of storage capacity and can store several-tens hours to several-hundreds hours of video data or the like.

As a substitute for the HDD 25, for example, a recording means employing an attachable/detachable recording media may be used.

In the present embodiment, in the case where the key data is added to the metadata of a content to be stored in the HDD 25, as far as the corresponding content is kept recorded (stored) in the HDD 25, the key data is set to be recorded and held in the HDD 25 as it is. In the case where reading out the data of a content recorded in the HDD 25 is not specifically restricted, reproduction processing is performed at an arbitrary time based upon an operation by a user on operation means (not shown) in the receiving device 10.

When the receiving device 10 receives a content (hereafter, content B) different from a content (hereafter, content A) recorded in the HDD 25 so that referring to the content A recorded in the HDD 25 is instructed by the metadata included in the received content B, a predetermined data in the metadata contained in the received content B is collated with the key data contained in the metadata of the content A recorded in the HDD 25, and only when the collation is confirmed, processing in which the content A is referred to can be performed.

The key data employed in this collation is public key data in generated secret key data and public key data on a broadcast station side for the content A, and the secret key data is held in a broadcast station without being open to the public. Processing in which the public key and the secret key are employed is described in detail later on.

Figure 4:
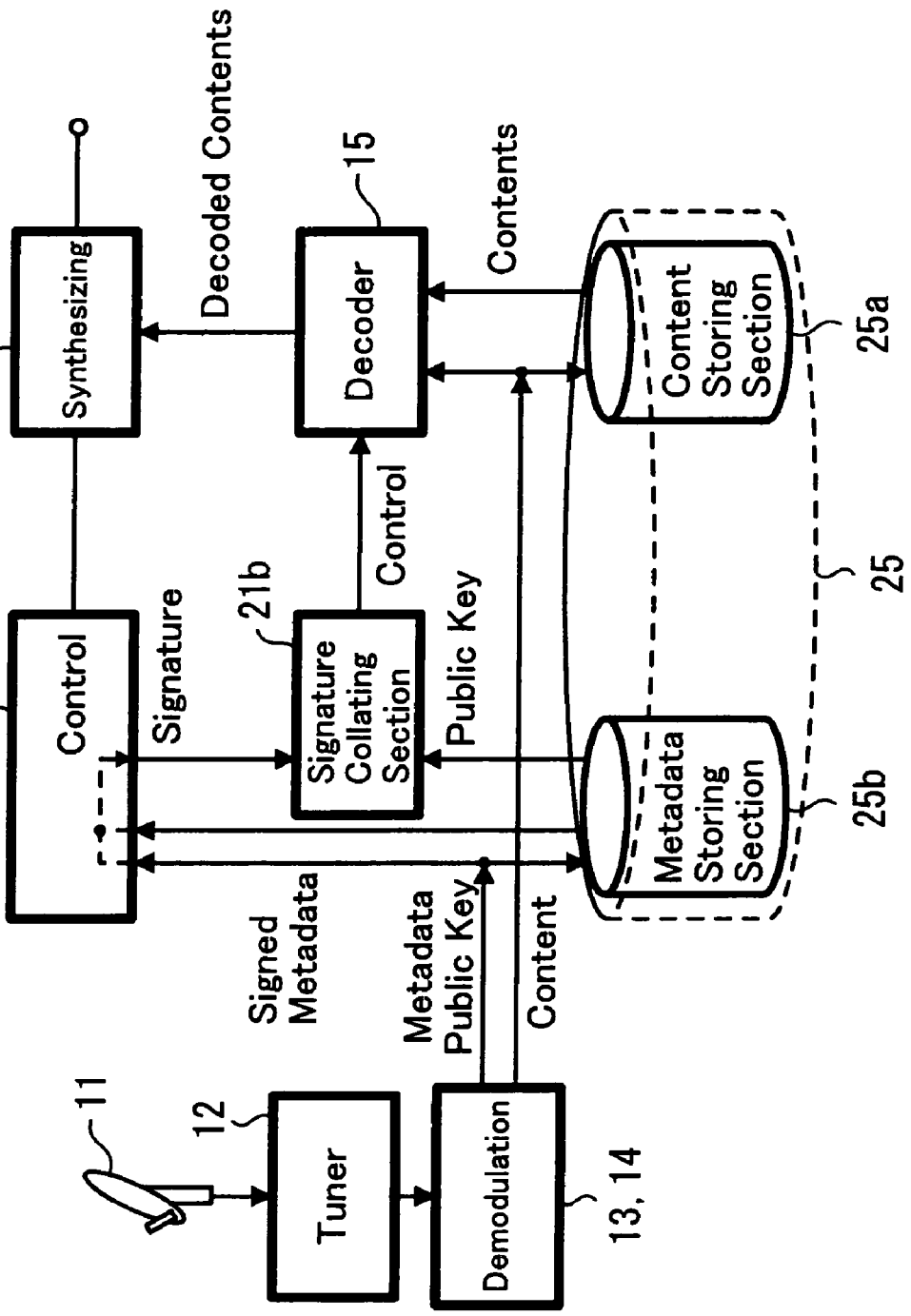
FIG. 4 is a block diagram showing a structure in which the receiving device shown in FIG. 3 is seen from data processing point of view.

Next, the configuration of the receiving device 10 in view of data processing in which the content B refers to the content A is illustrated in FIG. 4. The data of the content received in the tuner section 12 in the receiving device 10 and processed in the demodulation section 13 and the decoder 14, when being stored in the HDD 25, is stored in a content storing section 25a in the HDD 25, and the metadata and the public key data of the content are stored in a metadata storing section 25b in the HDD 25. In the content storing section 25a and the metadata storing section 25b in the HDD 25, a recording area is divided and is set virtually under the control of the disk controller 24.

The content B is received in the receiving device 10, and a control section 21a in the CPU 21 judges the metadata of the content B so that a part of data in the metadata of the content B is sent from the control section 21a to a signature collating section 21b constituted in the CPU 21 when it is required that the stored content A is referred to. In the signature collating section 21b, the collation of an electronic signature of the data is performed by employing the public key data added to the metadata of the content A stored in the HDD 25, and when the collation is confirmed, the content A stored in the HDD 25 is read out to perform decoding in the MPEG decoder 15, and decoding of the data of the content B is also performed. The video data and the audio data of the decoded contents A, B are performed synthesizing processing (or selection processing) in the synthesizing section 16 and the synthetic image generating section 17 by the mode instructed by the metadata of the content B and are outputted from the receiving device 10.

When the collation of the electronic signature cannot be confirmed in the signature collating section 21b, the decoding of the content A is not allowed in the MPEG decoder 15, and is restricted so that the content A cannot be referred to at the time of output of the image and audio of the content B.

Figure 5:
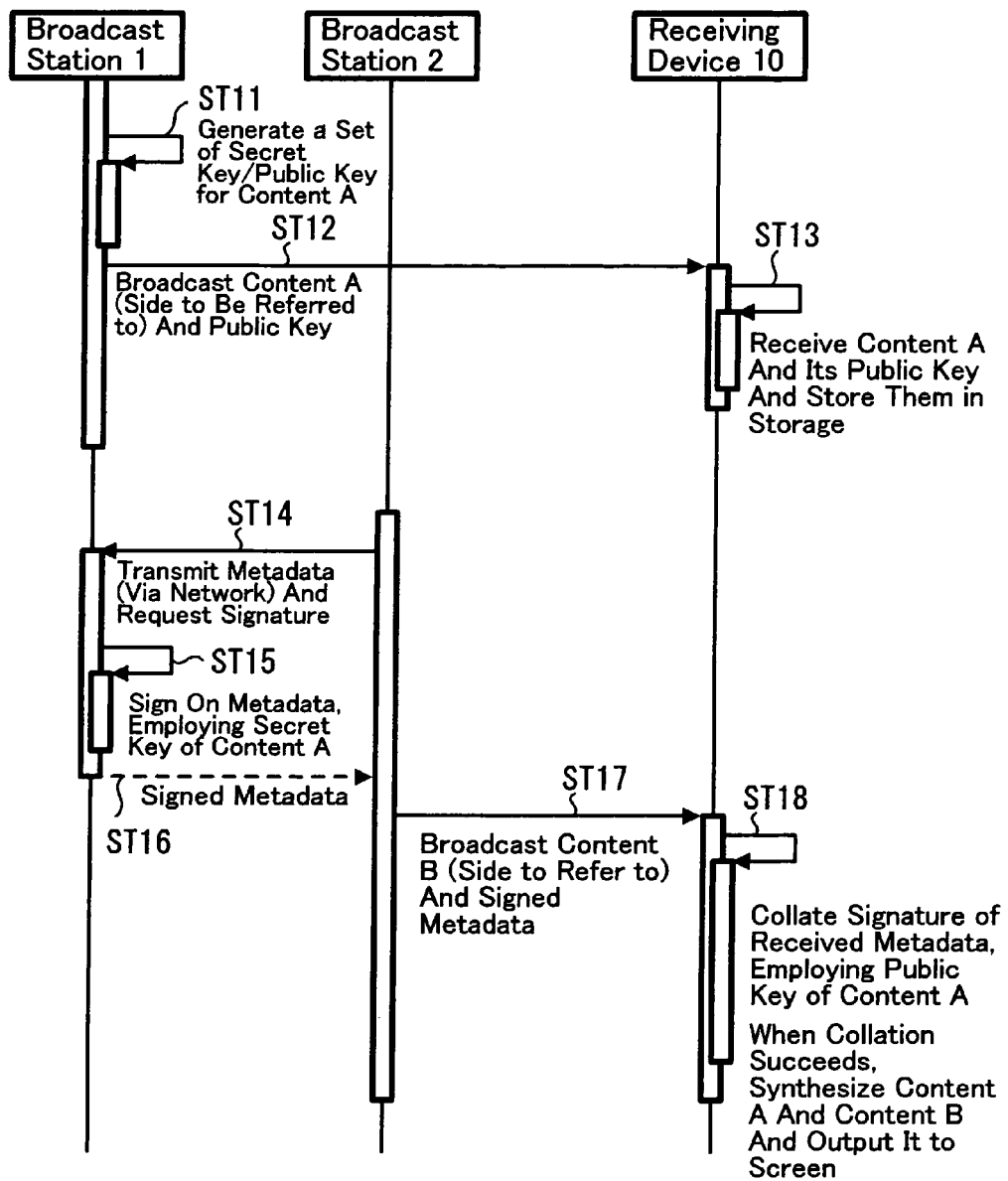
FIG. 5 is a chart in which broadcast operations and receiving operations according to an embodiment of the present invention are shown in accordance with the flow of time.

Next, the flow of referring processing of the content A by the content B as described above is explained referring to the chart of FIG. 5. FIG. 5 is a flow chart in view of the entire broadcast system, and in this chart, the broadcast station 1 shown in FIG. 1 sends the content A, the broadcast station 2 shown in FIG. 1 sends the content B, and each of the contents A, B is received in the receiving device 10.

In the broadcast station 1, prior to the sending of the content A, a set of the secret key data and the public key data for the content A is generated (step ST11), and when the content A is broadcasted, the public key data generated at that time is added to the metadata (step ST12). The receiving device 10 receives the content A, and when the content A is stored in the HDD 25 in the receiving device 10, the public key data added to the metadata is also stored therein (step ST13).

Thereafter, when the content B that refers to the content A is generated in the broadcast station 2, the broadcast station 2 sends the metadata of the content B to the broadcast station 1 via the network 3 and requests an electronic signature (step ST14). At this time, the broadcast station 1 decides whether to assent to the request from the broadcast station 2 or not, judging by the condition, the content, and the like of the request. Whether to answer the request or not is decided by judging, for example, the license condition, the usage fee of the content A, and the like.

When the broadcast station 1 complies with the request, an electronic signature is made on a part of the metadata of the content B or data related to the metadata of the content B by employing the secret key data generated for the content A (step ST15). The electronically signed metadata is transmitted from the broadcast station 1 to the broadcast station 2 via the network 3 (step ST16).

After the broadcast station 2 receives the electronically signed metadata, the received electronically signed metadata is added to the content B (strictly speaking, the data of the content B plus the original metadata of the content B plus the electronically signed data), and the content B is transmitted at the start time of broadcasting (step ST17).

When the receiving device 10 receives the broadcasted content B so that the CPU 21 in the receiving device 10 decides that referring to the content A is instructed by the metadata of the content B, the electronically signed metadata is decoded by employing the public key data of the content A stored in the receiving device 10 to generate decoded data. A data conversion of the metadata of the content B is also performed by the same predetermined algorithm that the transmission side has employed in the electronic signing so that converted data is generated. Then, collation processing between the decoded data and the converted data is performed. It is decided whether the collation succeeds or not, and only when the collation succeeds, the stored content A and the received content B are synthesized by the method instructed by the metadata of the content B to output synthesized data from the receiving device 10, whereby it is watched or listened to through the connected image receiver 5 (step ST18). The data obtained by synthesizing the content A and the content B may not be outputted at the same time when the content B is received, but the content B may be stored in the HDD 25 in the receiving device 10 so that when the stored content B is outputted, synthesizing or the like is performed referring to the content A.

Figure 6:
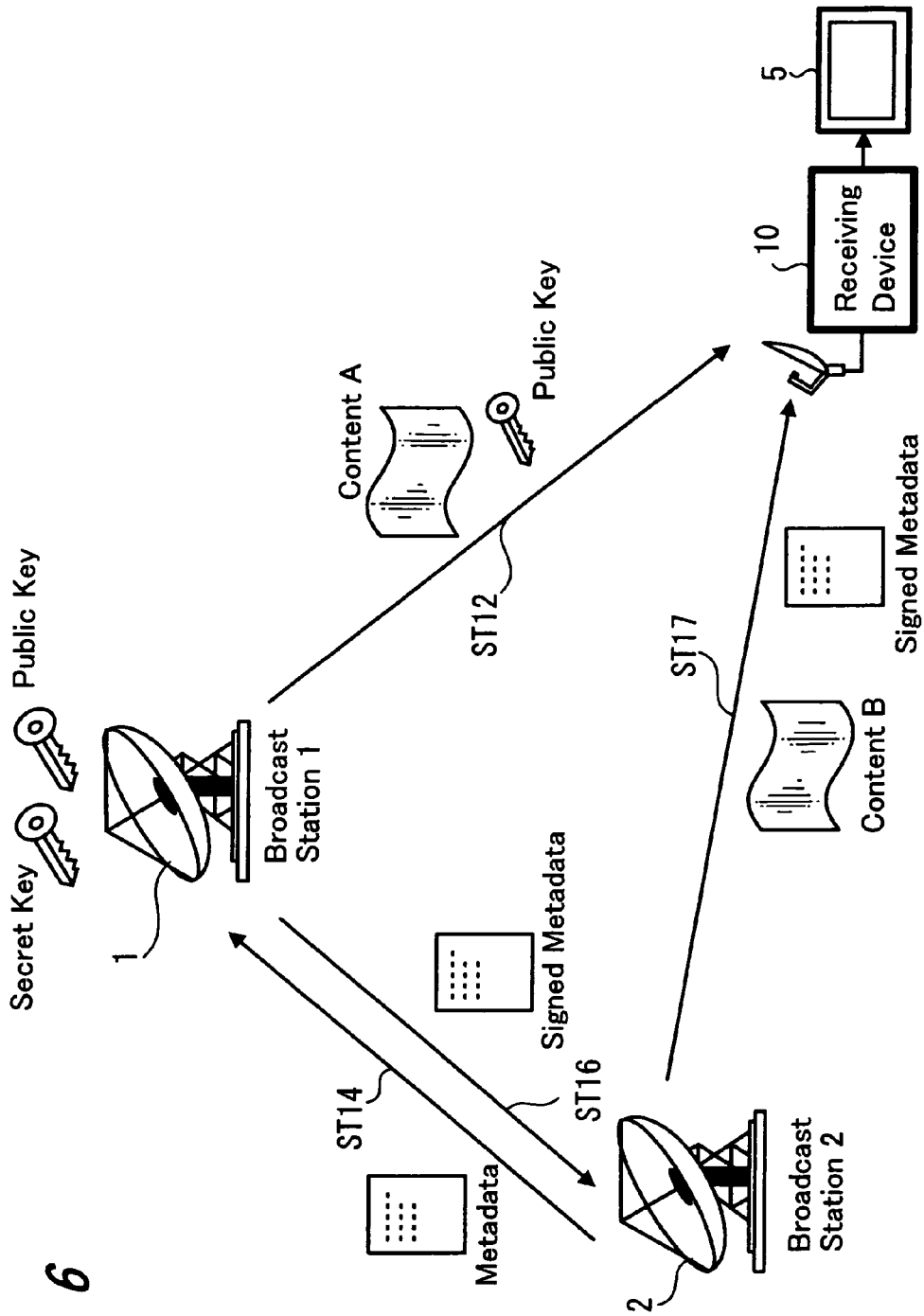
FIG. 6 is an explanatory diagram in which the processing shown in FIG. 5 is shown in accordance with the flow of data.

FIG. 6 is a diagram in which the processing shown in the flow chart of FIG. 5 is seen from the flow of data. The step numbers in FIG. 6 correspond to those of FIG. 5. In the broadcast station 1 broadcasting the content A, the secret key data and the public key data are generated, and when the content A is broadcasted, the public key data is added to the data of the content A. The request for the signature to the metadata and sending back the requested metadata are performed between the broadcast station 2 broadcasting the content B referring to the content A and the broadcast station 1. The broadcast station 2 broadcasts the content B to which the signed metadata is added.

Figure 7:
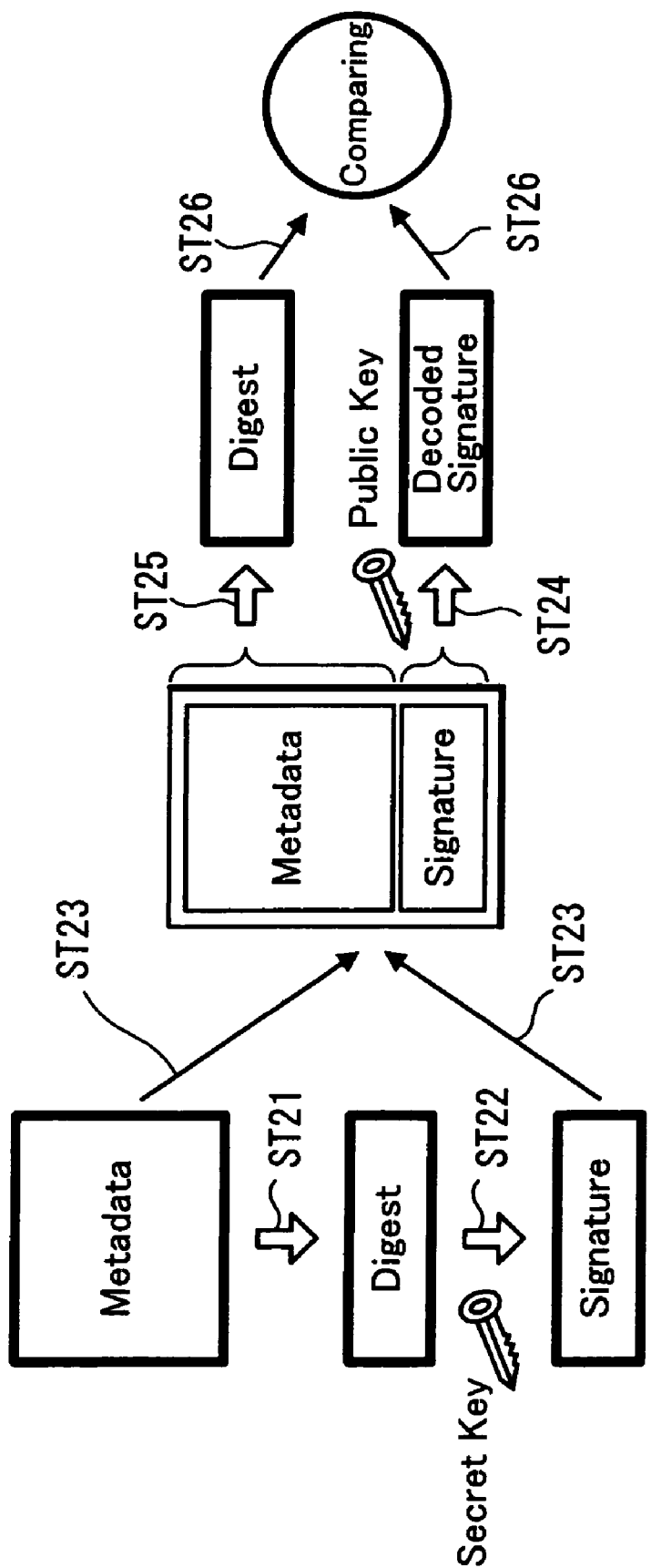
FIG. 7 is an explanatory diagram showing a processing example in which the secret key and public key are employed.

Here, an example of processing of the electronic signature by employing the secret key data and the public key data is explained referring to FIG. 7. When there is metadata of the content B on which an electronic signature is desired to make, a message digest of the metadata is formed (step ST21). The metadata of this time includes at least a commend to refer to the content A. The message digest here has a fixed length of bit pattern (for example, approximately 128 bits) representing a characteristic of the original data and is generated by a predetermined algorithm. Regarding the message digest, the probability that the same message digest is generated from a different data is extremely low, and it is virtually impossible to change the original data (metadata) without changing the message digest.

Generating the message digest may be performed on, for example, the broadcast station 2 side (may be performed on the broadcast station 1 side). The message digest is sent to the broadcast station 1 to be encrypted by employing the secret key data held in the broadcast station 1 to thereby produce an electronically signed data (step ST22). As a public key encryption system employed at this time, RSA mode and the like is known. In the broadcast station 2, the data of the electronically signed message digest is added to the metadata of the content B and is broadcasted (step ST23).

In the receiving device which has received the content B, the data of the electronically signed message digest added to the metadata of the content B is extracted, and the data of the electronically signed message digest is decoded by the public key data of the content A held in the receiving device (step ST24). In the receiving device, a message digest is generated from the metadata of the content B (step ST25). At this time, the same algorithm as that used at the time of generating the message digest at step ST21 is used. In the receiving device, the generated message digest is compared with the decoded data (step ST26), and when they correspond to each other, it is decided that the electronic signature is confirmed in the receiving device.

Figure 8:
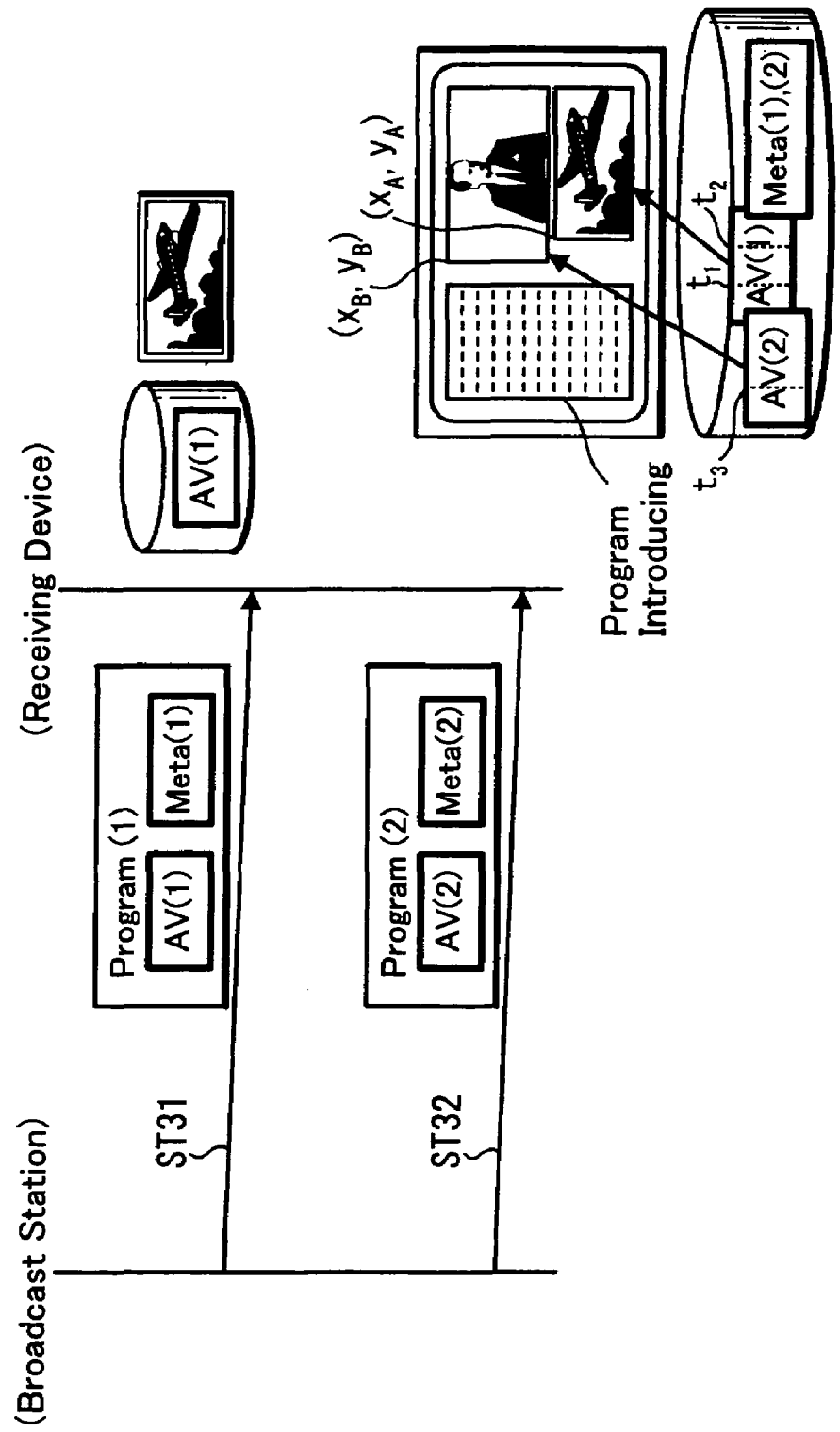
FIG. 8 is an explanatory diagram showing an example in which a past content is utilized (an example of program introducing) according to an embodiment of the present invention.

Next, an example of processing of referring to the content A by the content B, which is executed through the processing described above is explained. FIG. 8 is an example in which the content B is one which performs program introducing of the content A. After the content A is broadcasted together with the public key described in the meta (1) at step ST31 so that its data is stored in the receiving device, when the content B referring to the content A is transmitted at step ST32, according to the description of the meta (2), an image of a main scene or the like of the video data AV (1) of the content A is reduced and is displayed on the screen of the image receiver connected to the receiving device. An image or the like of an introducer of the program or the like by the video data AV (2) of the content B is synthesized and is displayed. Here, the AV (1) that is referred to, a reference area (start/end positions), and information related to a display position, a ratio of reduction, and timing on the screen of the AV (1) and the AV (2) are described in the meta (2) together with an electronic signature on these descriptions. The content of the program of the content A may be described in the meta (2) as text data, and an image introducing the content with letters and the like may also be generated in the receiving device based upon the instruction of the meta (2) that is data of the content B (that is, a display position, a timing, a display due form, and the like) so that images may be displayed at the same time. Regarding the audio, the audio by the content B may also be synthesized with part of the audio of the program of the content A.

An example of the metadata in the example shown in FIG. 8 is shown as follows.

```
<Metadata>
......
<Reference id= "R1" >
    <Reference destination>
        <Content>AV1</Content>
        <Start position>t₁</Start position>
        <End position> t₂</End position>
    </Reference destination>
    <Presentation form>
        <Child screen display>
            <Reference content display position>(X_A, Y_A)</Reference content display position >
            <Reference content reduction ratio>50%</Reference content reduction ratio>
            <Original content display position>(X_B, Y_B) </Original content display position>
            <Original content reduction ratio>50%</Original content reduction ratio>
            <Display timing>t₃</Display timing>
        </Child screen display>
    </Presentation form>
</Reference>
......
<Signature>
    <Signature xmlns="http://www.w3c.org/2000/09/xmldsig#">
        <SignedInfo>
......
            <ReferenceURI= "#R1" >. . . .</Reference>
        </SignedInfo>
    <Signature>
    </Signature>
</Metadata>
```

The signature part of the metadata of this example is a description according to the specification of XML-Signature. In this example, it is shown that the subject of the signature is the part starting from <reference id="R1">. As the display form of the child screen display, as shown in FIG. 8, the display positions $(X_A, Y_A)$ and $(X_B, Y_B)$ in one screen (refer to FIG. 8) and the reduction ratio for display are specified.

Figure 9:
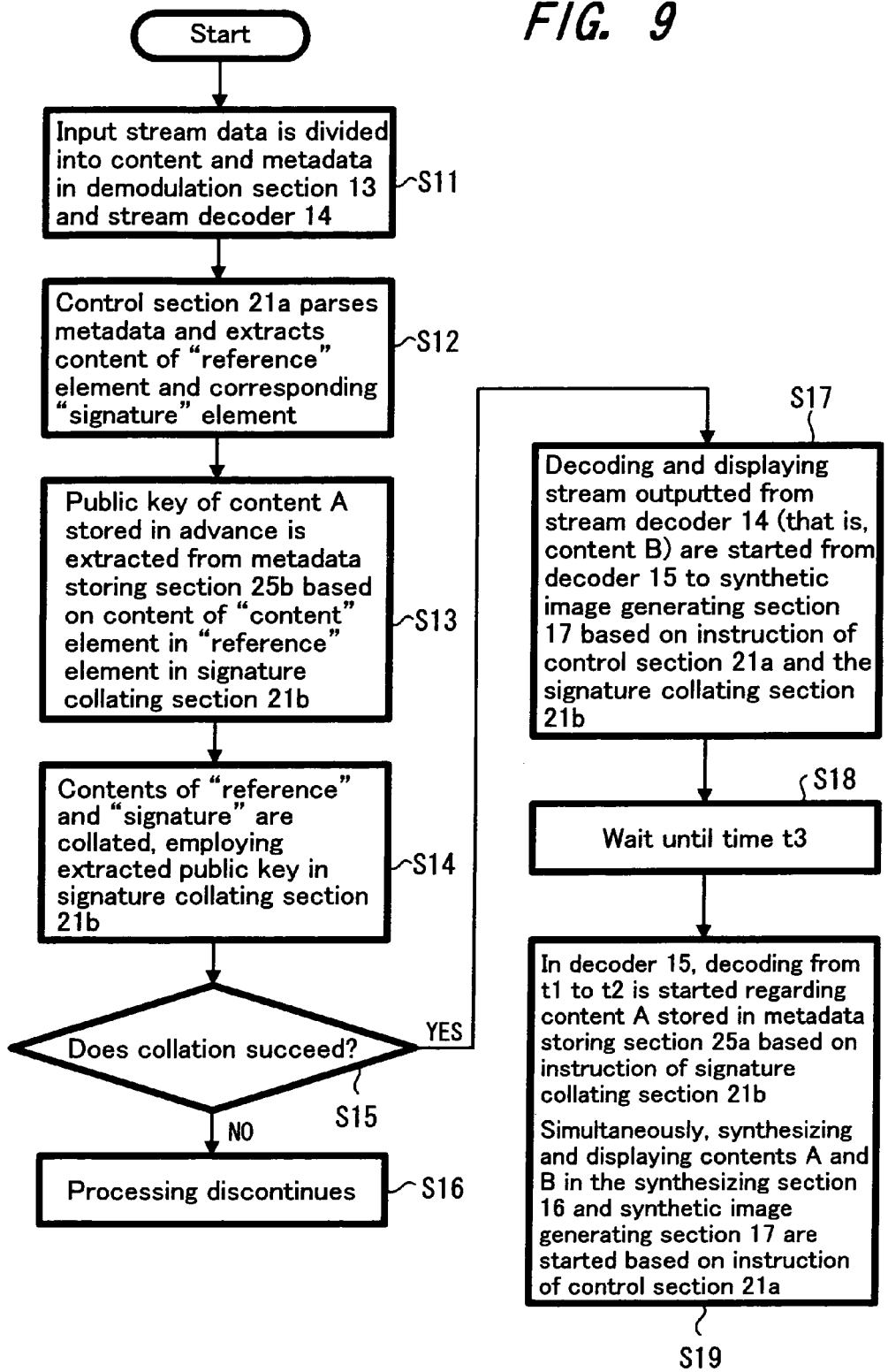
FIG. 9 is a flow chart showing the processing in the example of FIG. 8.

FIG. 9 is a flow chart showing a processing example on the terminal side in the example of FIG. 8. As explained according to this flow chart, first, in step S11, input stream data is divided into a content and metadata, in the demodulation section 13 and the stream decoder 14.

Then, in step S12, the control section 21*a* parses the metadata and extracts the content of a "reference" element and a corresponding "signature" element. In step S13, the public key of the content A stored in advance is extracted from the metadata storing section 25*b* based on the content of the "content" element in the "reference" element in the signature collating section 21*b*.

In step S14, the contents of "reference"/"signature" are collated by employing the extracted public key in the signature collating section 21*b*.

At this time, in step S15, it is determined whether or not the collation succeeds, and when the collation does not succeed, the process proceeds to step S16 to discontinue the processing. In the case where the collation succeeds, the process proceeds to step S17, and decoding and displaying the content B that is a stream outputted from the stream decoder 14 are started in the decoder 15, the synthesizing section 16, and the synthetic image generating section 17 based on an instruction of the control section 21*a* and the signature collating section 21*b*.

Thereafter, the process proceeds to step S18 and waits until the time $t_3$. Further, the process proceeds to step S19, and in the decoder 15, decoding from the timing $t_1$ to the timing $t_2$ is started regarding the content A stored in the metadata storing section 25*a* based on an instruction of the signature collating section 21*b*. At this time, simultaneously, synthesizing and displaying the content A and the content B in the synthesizing section 16 and the synthetic image generating section 17 are started based on an instruction of the control section 21*a*.

An example in which program introducing is performed is given. However, another referring processing may be performed. For example, as the content A, a program of a relay of sport such as a soccer game is set, and as the content B, a sports news program introducing only a part of scenes such as highlight scenes of the relay of the sport is set, when the content B is watched or listened to, the image or audio successively introducing highlight scenes in the images stored as the content A may be outputted.

In the case where a content such as a movie, a video drama, or the like (content A) is referred to as a teaching material for language study, data for referring to the content A is sent in the content B, and instead of introducing the program shown in FIG. 8, performed is such processing on the content A as some editing that the original language, the translation, or the like of players' parts may be displayed by letters at the same time the video and audio are outputted, or translated voice may be outputted.

By performing the processing of the present embodiment as described above, it becomes possible to watch or listen to the content B referring to the content A which has been already sent and stored. In any case, since such referring processing is performed on the receiving device side only when the correspondence is confirmed by employing the public key data, as far as the broadcast station side transmitting the content A does not leak the secret key data to the outside, it is impossible to watch or listen referring to the content A, unless approval is given from the broadcast station that has transmitted the content A. Thus, referring to content in the form that a copyright or the like is infringed can be efficiently prevented.

FIG. 10 is an example of the case where part of the video and audio of the content A is replaced with the video and audio of the content B as referring processing of the content A performed by the content B. That is, as shown in FIG. 10A, it is supposed that specific commercials CM1, CM2, CM3, . . . are inserted at the times of changes of scenes such as scene 1, scene 2, scene 3, and the like in a program by the content A. At that time, as shown in FIG. 10B, the video and audio of commercials CM11, CM12, CM13, . . . for replacing the commercials CM1, CM2, CM3, . . . of the content A is transmitted as the content B. In this case, the data of the content B is also stored in the HDD in the receiving device. In this data, the start/end positions of CM1, CM2, CM3, . . . in the content A, the start/end positions of CM11, CM12, CM13, . . . in the content B, and the command which orders replacing CM1 with CM11, CM2 with CM12, . . . are described together with electronic signature to these descriptions. When the program of the content A is watched or listened to after the content B is received, the commercials CM1, CM2, CM3, . . . are replaced with the commercials CM11, CM12, CM13, . . . and the program is outputted and watched or listened to according to an instruction of the data stored in the HDD as shown in FIG. 10C.

An example of the metadata in the example shown in FIG. 10 is shown as follows.

```
<Metadata>
  ......
  <Reference id= "R1" >
      <Reference destination>
           <Content>content A</Content>
           <Start position>s₁</Start position>
           <End position>e₁</End position>
      </Reference destination>
      <Presentation form>
           <Replacement>
           <Content>content A</Content>
           <Start position>s₁₁</Start position>
           <End position>e₁₁</End position>
           </Replacement>
      </Presentation form>
  <Reference>
  <Reference id= "R2" >. . . .</reference>    (. description
  regarding CM2, CM12)
  <Reference id= "R3" >. . . .</reference>    (. description
  regarding CM3, CM13)
  ......
  <Signature>
      <Signature xmlns="http://www.w3c.org/2000/09/xmldsig#">
           <SignedInfo>
           ......
                <ReferenceURI= "#R1" >. . . .</Reference>
           </SignedInfo>
      <Signature>
      </Signature>
      <Signature>. . . . .</Signature>   (. signature of <Reference
           id= "R2" >part)
      <Signature>. . . . .</Signature>   (. signature of <Reference
  id= "R3" > part)
  </Metadata>
```

The parts described within parentheses in this example of the metadata explain the contents of the metadata. The signature parts of the metadata of this example are also descriptions according to the specification of XML-Signature, and the description of <ReferenceURI="#R1"> expresses that the subject of the signature is the part starting from <reference id="R1">.

In this example, Start position $s_1$ and End position $e_1$ of CM1 of the content A are described as <Reference destination>. Also, Start position $s_{11}$ and End position $e_{11}$ of CM11, of the content B, whose presentation forms are <Replacement> are described, expressing that CM1 of the content A is replaced with CM11 of the content B.

Figure 11:
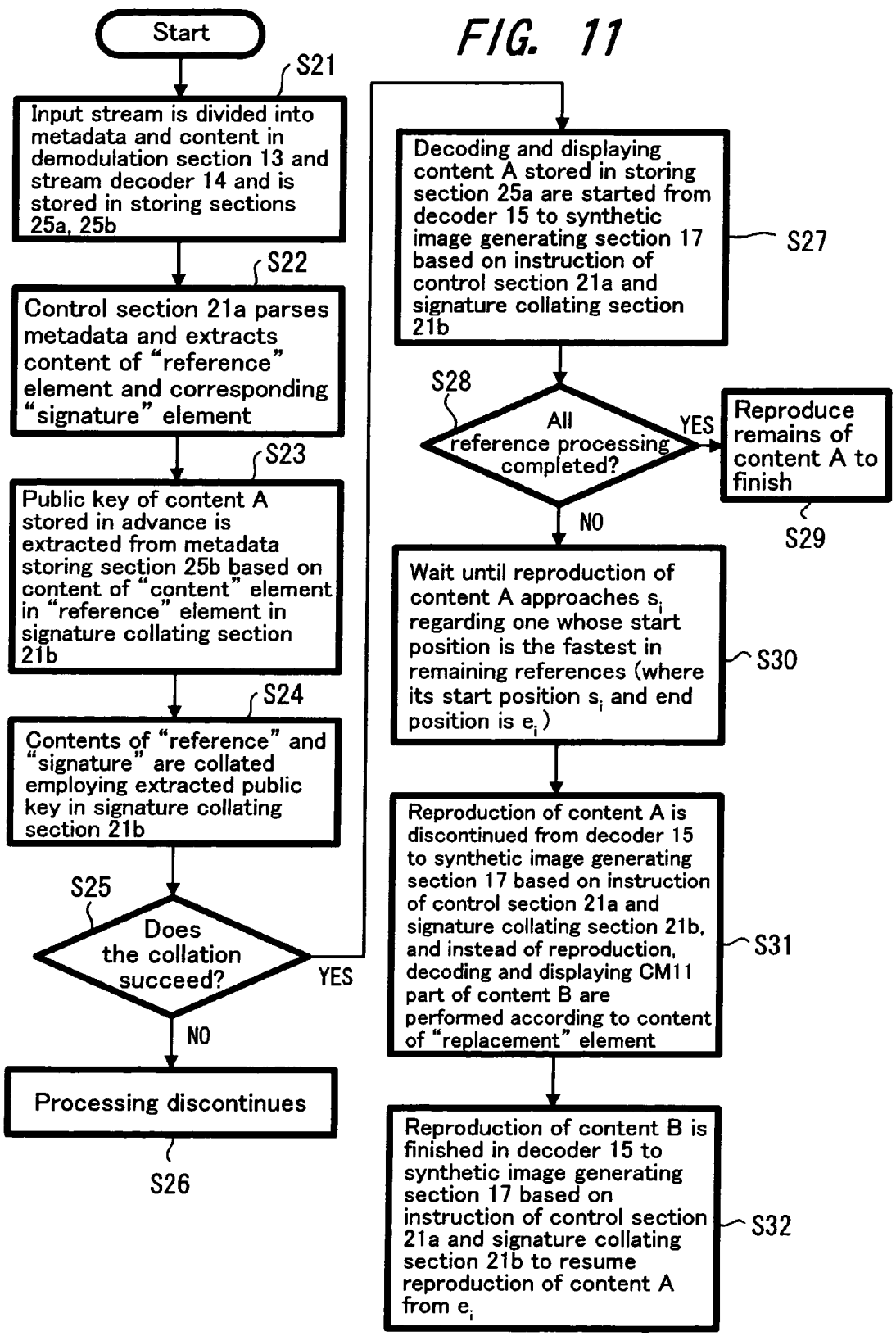
FIG. 11 is a flow chart showing the processing in the example of FIG. 10.

FIG. 11 is a flow chart showing a processing example on the terminal side in the example of FIG. 10. As explained according to this flow chart, first, in step S21, input stream data is divided into a content and metadata in the demodulation section 13 and the stream decoder 14, the stream data is stored in the content storing section 25a, and the metadata is stored in the metadata storing section 25b.

Then, in step S22, the control section 21a parses the metadata and extracts each content of a "reference" element and a corresponding "signature" element. In step S23, the public key of the content A stored in advance is extracted from the metadata storing section 25b based on the content of the "content" element in the "reference" elements in the signature collating section 21b.

After the public key is extracted, the process proceeds to step S24, each of the contents of respective "reference"/"signature" are collated by employing the extracted public key in the signature collating section 21b. Then, in step S25, it is determined whether or not this collation succeeds. When the collation does not succeed, the process proceeds to step S26 to discontinue the processing.

When the collation succeeds, the process proceeds to step S27, and decoding and displaying the content A stored in the content storing section 25a are started in the decoder 15, the synthesizing section 16, and the synthetic image generating section 17 based on an instruction of the control section 21a and the signature collating section 21b.

Thereafter, the process proceeds to step S28 and determines whether or not all the processing is completed, and when it is determined that all the processing has been completed, the process proceeds to step S29 to reproduce the remains of the content A to finish.

When it is determined that all the processing has not been completed in step S28, the process proceeds to step S30. Here, when the earliest start position in the remaining references is designated as $s_i$ and its end position is designated as $e_i$ (refer to FIG. 10A), the process waits until the reproduction of the content A approaches the start position $s_i$.

The process proceeds to step S31, the reproduction of the content A is discontinued in the decoder 15, the synthesizing section 16, and the synthetic image generating section 17 based on an instruction of the control section 21a and the signature collating section 21b, and instead of the reproduction, decoding CM11 of the content B and displaying the data decoded this time are performed from the start position $s_n$ (refer to FIG. 10B) in accordance with the content of the "replacement" element.

Then, the process further proceeds to step S32, and the reproduction of the content B is finished at the end position $e_n$ (refer to FIG. 10B) in the decoder 15, the synthesizing section 16, and the synthetic image generating section 17 based on an instruction of the control section 21a and the signature collating section 21b to resume the reproduction of the content A from the position $e_i$.

By processing as shown in FIGS. 10 and 11, for example, in the case where there is a seasonal effective time period or the like in the contents advertised by the commercials first contained in the content A, and when the term expires, by sending new commercials as the content B, the most up-to-date commercials can be watched or listened to on the user side. In this case, as far as replacing the commercials first inserted in the content A with the new commercials is not approved, the new commercials are not replaced with other commercials. As a result, the new commercials are not replaced in the form that the right of a sponsor broadcasting the first commercials is infringed.

Figure 12:
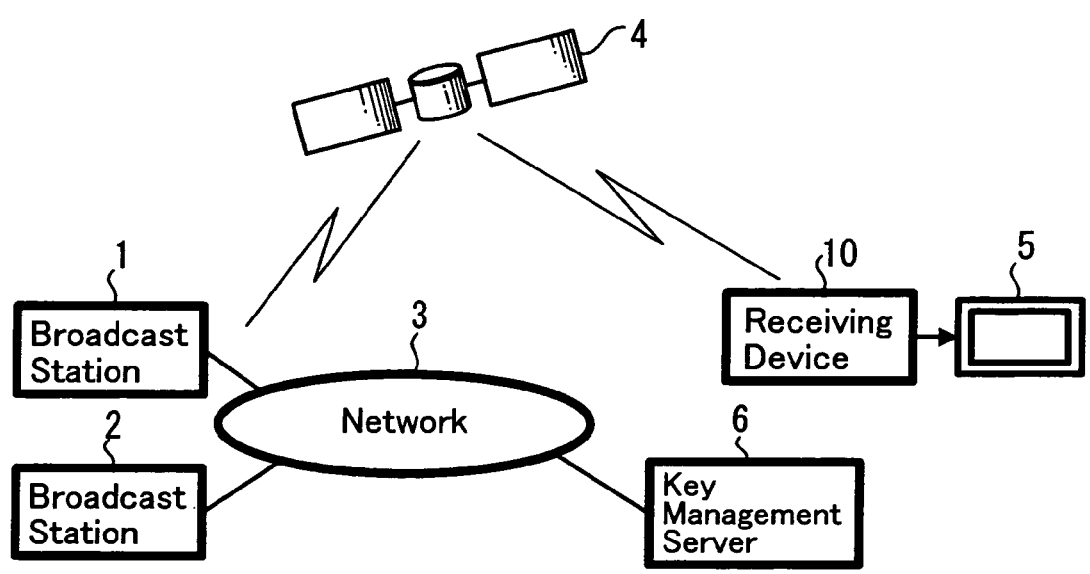
FIG. 12 is a structural diagram showing an example of the entire configuration of a broadcast system according to another embodiment of the present invention.

So far in the explanation above, although the key data of each content is held in a broadcast station, a key management server (a key management company) different from the broadcast station may be provided on a network so that the key management server may manage the secret key data and/or the public key data. FIG. 12 is a diagram showing an example of system configuration of such a case, where a key management server 6 is connected to the network 3 connected to the broadcast station 1, 2.

Figure 13:
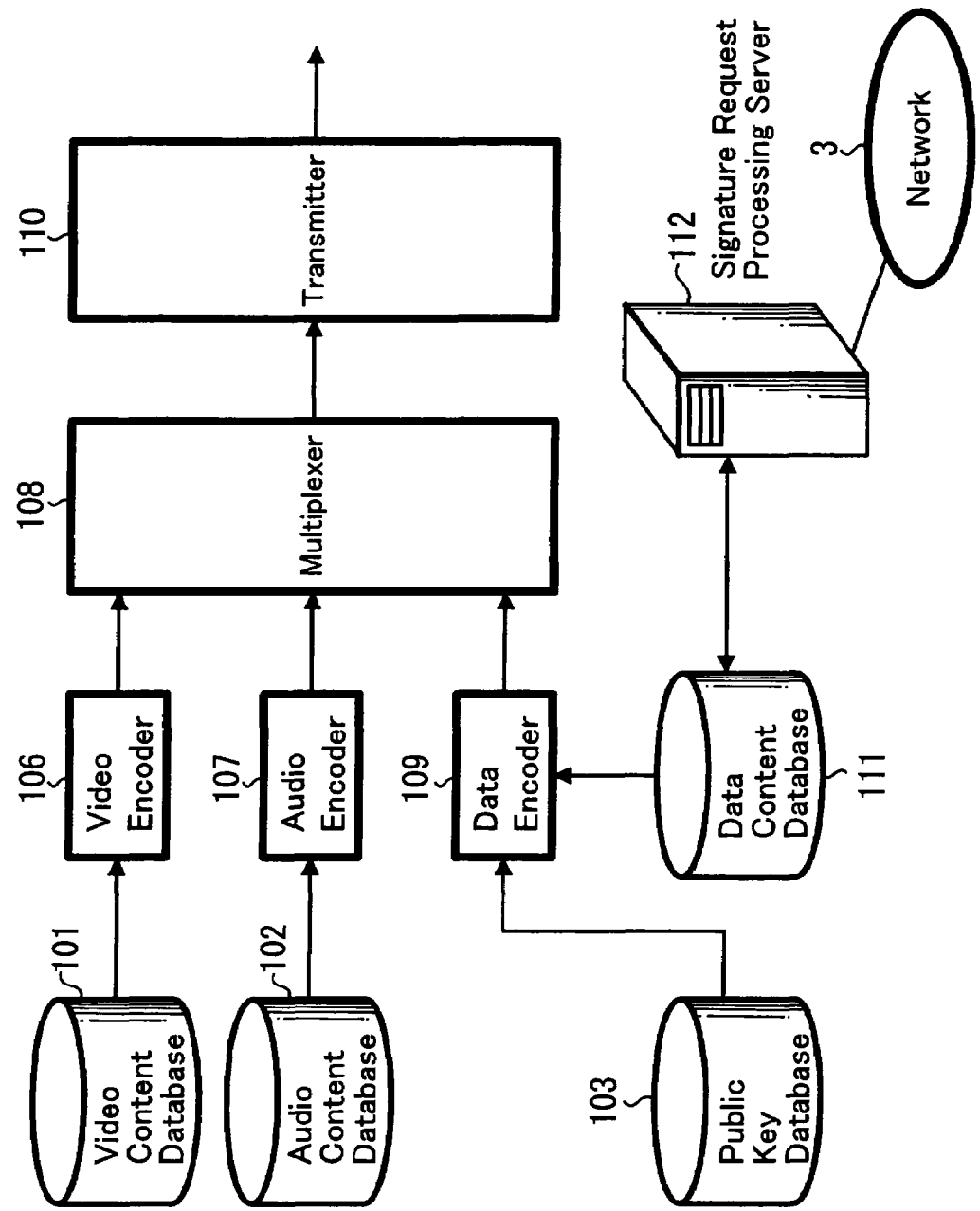
FIG. 13 is a block diagram showing an example of configuration of a broadcast station applied to a system of the example of FIG. 12.

FIG. 13 is a diagram showing a structural example of the broadcast station 1, 2 in the case where the key management server 6 is separated from the broadcast station 1, 2.

In the example, as databases prepared are the video content database 101, the audio content database 102, the public key database 103, and the data content database 111. A public key is stored in the public key database 103.

Video/audio/data contents that become broadcast material are stored in the video content database 101 and the audio content database 102. The video content data outputted from the video content database 101 is encoded into an MPEG video stream packet in the video encoder 106 to be supplied to the multiplexer 108. The audio stream packet outputted from the audio content database 102 is encoded into an MPEG audio stream packet in the audio encoder 107 to be supplied to the multiplexer 108.

The multiplexer 108 multiplexes a video packet, an audio packet and data supplied from the data encoder 109, and supplies it to the transmitter 110 to transmit the multiplexed data as broadcast data.

The data encoder 109 performs encoding processing for converting a data content supplied from the data content database 111 and a public key data supplied from the public key database 103 into an MPEG data packet to supply the processed MPEG data packet to the multiplexer 108.

When the signature request processing server 112 is the broadcast station of the side requesting a signature, the server 112 transmits the metadata through the network 3 to the side requested to give a signature and receives the singed metadata via the network 3 so that the signed metadata is stored in the data content database 111.

Figure 14:
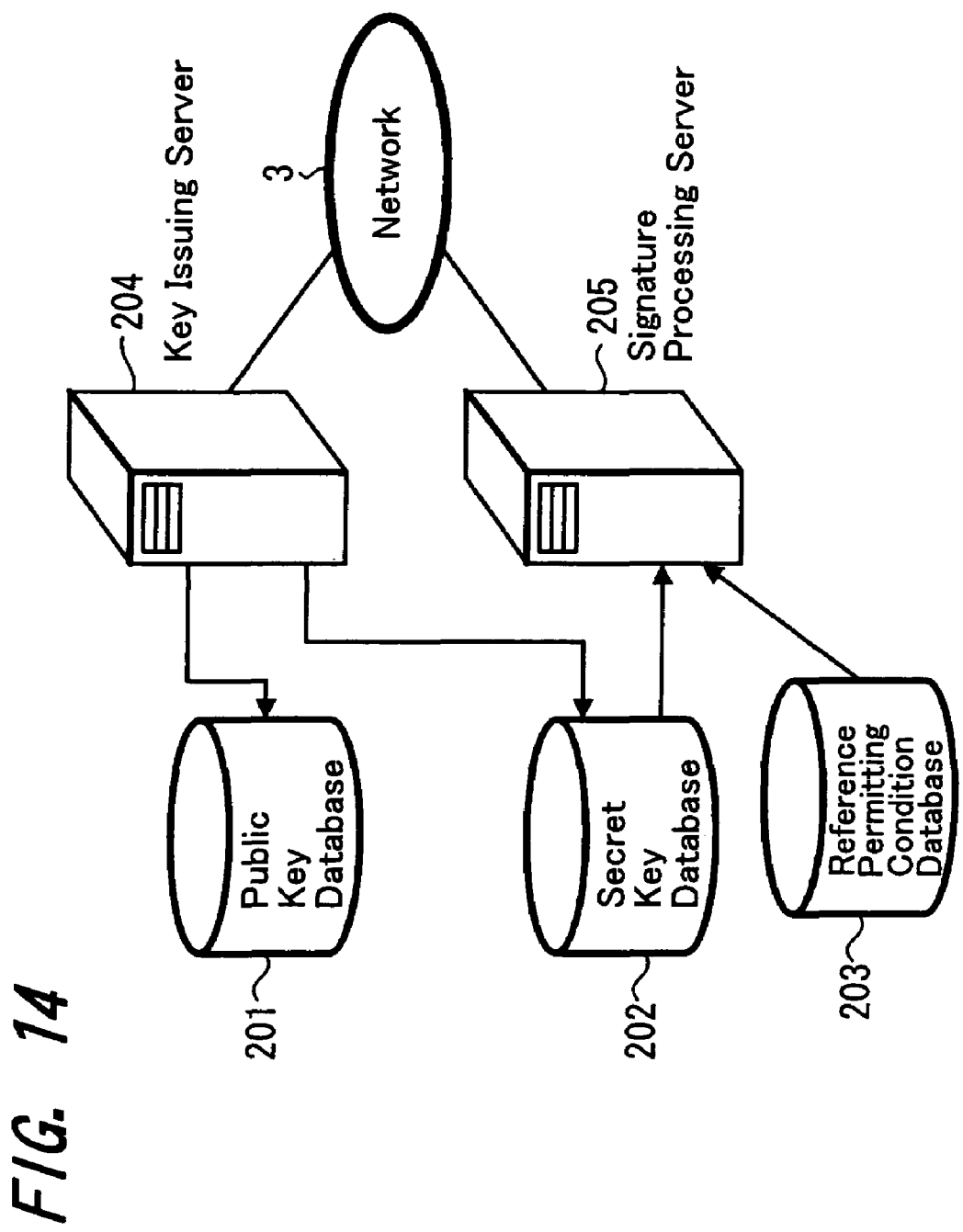
FIG. 14 is a block diagram showing an example of configuration of a key server applied to a system of the example of FIG. 12.

FIG. 14 is a diagram showing a structural example of the key management server 6. The key management server 6 is provided with a public key database 201, a secret key database 202, and a reference permitting condition database 203 as databases. The public key and the secret key stored in the public key database 201 and the secret key database 202 respectively are generated by a key issuing server 204. When there is a request of a signature on metadata via the network 3 and when a reference condition stored in the reference permitting condition database 203 is fulfilled, a signature processing server 205 signs on the metadata by employing the secret key that the secret key database 202 stores, and transmits it to the requesting broadcast side via the network 3.

Figure 15:
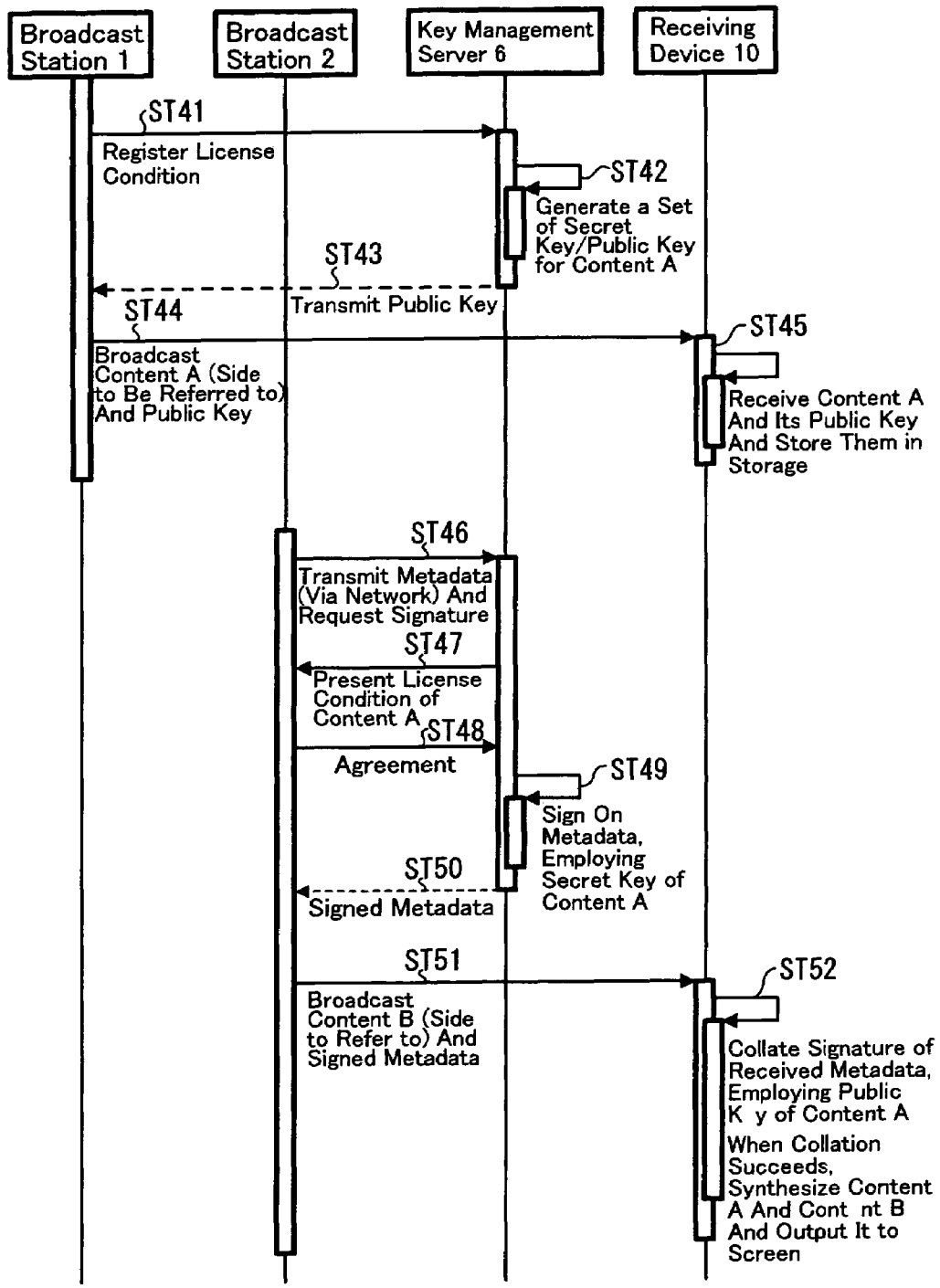
FIG. 15 is a diagram in which broadcast operations and receiving operations according to another embodiment of the present invention are shown in accordance with the flow of time.

FIG. 15 is a chart showing a transmission processing example of the contents A, B in the case where the key management server 6 is employed. First, in the broadcast station 1 which transmits the content A, a license condition of the time when another content utilizes the content A is registered in the key management server 6 (step ST41). In the key management server 6, the secret key data and the public key data for the content A are generated (step ST42), and only the public key data is sent to the broadcast station 1 (step ST43). The secret key data is held in the key management server 6.

After the processing so far is completed, the broadcast station 1 adds the public key data to the metadata in the content A and transmits them (step ST44). The receiving device 10 receives the content A, and when the content A is stored in the HDD 25 in the receiving device 10, the public key data added to the metadata is also stored (step ST45).

Thereafter, when the content B referring to the content A is generated in the broadcast station 2, the broadcast station 2 sends the metadata of the content B to the key management server 6 via the network 3 to request an electronic signature (step ST46). At this time, the key management server 6 sends the data of the license condition registered for the content A to the broadcast station 2 (step ST47), and when the data agreeing to the license condition is sent to the key management server 6 (step ST48), an electronic signature is made on a message digest generated from the metadata of the content B, as employing the secret key data generated for the content A (step ST49). The electronically signed metadata is transmitted from the key management server 6 to the broadcast station 2 via the network 3 (step ST50).

After the broadcast station 2 receives the electronically signed metadata, the received electronically signed data is added to the metadata of the content B, and when the broadcasting start time comes, the content B is transmitted (step ST51).

When the receiving device 10 receives the broadcasted content B, and the CPU 21 in the receiving device 10 judges that referring to the content A is instructed by the metadata of the content B, part of the metadata of the content B is collated by employing the public key data of the content A stored in the receiving device 10 to decide whether or not the collation succeeds. Only when the collation succeeds, the stored content A and the received content B are synthesized by the method instructed by the metadata of the content B to output the synthesized data from the receiving device 10. Then the synthesized data will be watched or listened to in the connected image receiver 5 (step ST52).

Figure 16:
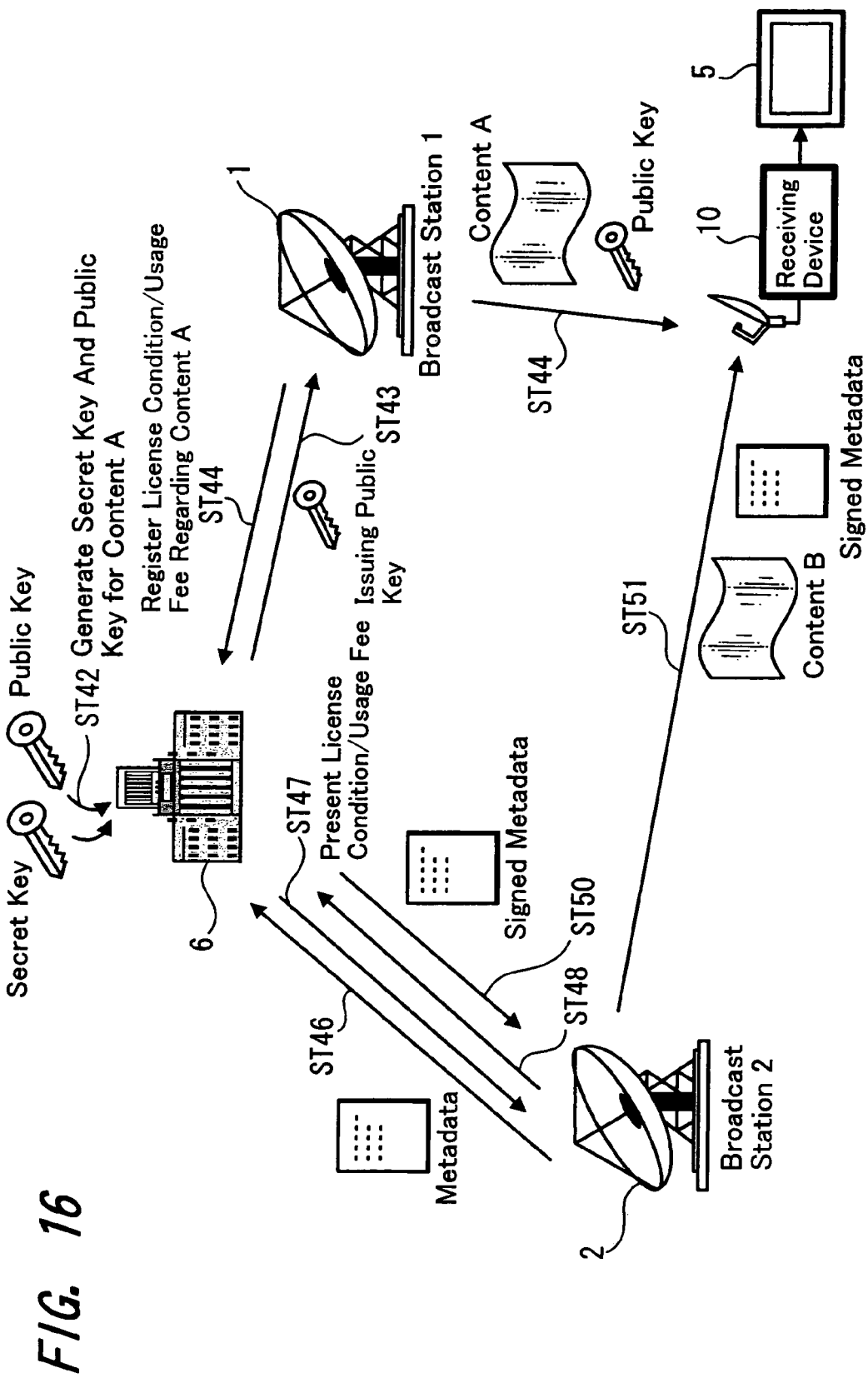
FIG. 16 is an explanatory diagram in which the processing shown in FIG. 12 is shown in accordance with the flow of data.

FIG. 16 is a diagram in which the processing shown in the flow chart of FIG. 15 is seen from the flow of the data. The step numbers in FIG. 16 correspond to those of FIG. 15. The secret key data and the public key data are generated and held in the key management server 6 different from the broadcast station 1 broadcasting the content A. When the broadcast station 1 broadcasts the content A, the public key data is added to the data of the content A. The request for a signature on the metadata and sending back the requested metadata are performed between the broadcast station 2 which broadcasts the content B referring to the content A and the key management server 6. The broadcast station 2 broadcasts the content B to which the signed metadata is added.

In the case where the key management server distinct from a broadcast station is provided, processing similar to that shown in FIG. 1 to FIG. 11 described above also becomes possible.

In the embodiments described above, the first broadcast station 1 distributing the content A and the second broadcast station 2 distributing the content B are different broadcast stations, however, the broadcast station distributing the contents A, B may be the same. Although a broadcast station here is shown as so called a transmitting place transmitting a content, such configuration that a broadcast station may only perform the distribution or management of a content, and the transmission of a content is performed by another transmitting place in a structure may be possible.

The embodiments described above are examples applied to a broadcast system utilizing a satellite broadcast. However, they can be applied to a broadcast system through another transmission line. In this case, not only a broadcast in a general sense, such as a television broadcast or a radio broadcast broadcasting on transmission channels prescribed in advance but also a service distributing contents to a plurality of unspecified users, employing a wireless or wired transmission line may be applicable. For example, the present invention can be applied to the case where various contents are distributed from a server (broadcast station) side to a terminal (a receiving device) of a plurality of unspecified users (or a plurality of users who signed a contract in advance) connected by some network such as so called the Internet broadcast.

In the explanation of the embodiments described above, a past content to which a content transmitted later on refers is supposed to be only one content. However, the embodiments can be applied to the case where a plurality of stored contents are referred to.

In the embodiments described above, scramble processing for each broadcasted content is not explained at all. However, some scramble processing may be performed to broadcast a content so that only the receiving device of a specified user who signed a contract can receive the content. In this case, by giving a scramble only at the time when the content B referring to the original content A is watched or listened to, only the user who signed a contract (charged) may watch or listen to the content B. Conversely, by giving a scramble to the content A instead of giving a scramble at the time of being referred to by the content B (e.g., program introducing or the like), only a user through accounting processing may completely watch or listen to the content A.

In the embodiments described above, the case where a broadcast signal is transmitted from a broadcast station to a reception terminal is explained. However, the present invention can also be applied to a case where stream data is transmitted in a form other than a broadcast.

Further, in the embodiments described above, in any of the broadcast stations and a receiving device, a data storing means, an encoder, a decoder, and the like are constructed by a circuit for the exclusive use. However, for example, software performing similar processing may be loaded in a data processing device such as a computer device or the like so as to function as a broadcast station or a receiving device. In this case, the software may be stored in a medium such as a disk, a tape, a memory card, and the like to be distributed and may also be distributed by employing a transmission medium such as the Internet.

INDUSTRIAL APPLICABILITY

With an information processing method, information processing apparatus, electronic device and medium according to the present invention, since correctly-signed predetermined data is added to another content only when the administrator of a first transmitted content permits it to be referred to, another content automatically refers to the content only when the content permitted to be referred to is received in the equipment of each receiving side storing the first transmitted content. Accordingly, while the right of the producer or broadcast manufacturer of a past content is protected, a new content referring to the past content can be manufactured and distributed at an arbitrary time.

In this case, only when the allowance is issued by the administrator of the past content, for example, it becomes excellently possible to form and watch or listen to another content utilizing part of a past specific content.

Only when the allowance is issued by the administrator of the past content, for example, it becomes possible to replace part of video or audio or the like of a past specific content with updated data so that the replaced part can be watched or listened to.

Further, only when the allowance is issued by the administrator of the past content, for example, it becomes possible to only display highlight scenes of a past specific content.

The invention claimed is:

1. An information processing apparatus for transmitting information via a network comprising:
    key management means for generating and managing a secret key and a public key for a first content,
    first transmission means for adding said public key to the first content and transmitting the first content with the added public key,
    requesting means for requesting an electronic signature produced by employing said secret key; and
    second transmission means for adding predetermined data incorporating said electronic signature to second content different from said first content and transmitting the second content to which said predetermined data is added, said predetermined data including a command to refer to the second content;
    wherein said second content includes reference to said first content for use of said first content with said second content;
    said key management means executing electronic signing only when it is judged that the reference to the first content by the second content does not infringe a predetermined right to the first content; and
    wherein the predetermined data includes first content insertion start position information and insertion end position information and second content reference start position information and reference end position information, thereby identifying portions of said first content to be used with a reference portion of said second content.

2. The information processing apparatus according to claim 1, further comprising electronically-signed data acquisition means for acquiring the electronically signed data.

3. An information processing method for processing a first content and a second content that refers to and is different from the first content, comprising the steps of
    generating a secret key and a public key for the first content,
    adding the generated public key to the first content and transmitting the first content with the added public key,
    requesting an electronic signature produced by employing the secret key;
    adding predetermined data incorporating said electronic signature to the second content, said predetermined data including a command to refer to the first content, and
    transmitting the second content to which said predetermined data is added,
    wherein said second content includes reference to said first content for use of said first content with said second content, and
    wherein the predetermined data includes first content insertion start position information and insertion end position information and second content reference start position information and reference end position information, thereby identifying portions of said first content to be used with a reference portion of said second content.

4. The information processing method according to claim 3, further comprising the steps of collating at a receiver, the electronic signature incorporated in the predetermined data added to the second content by employing the public key that had been added to the first content when the transmitted second content is received, and processing and outputting by the receiver the first content based on an instruction in the received second content when collation succeeds.

5. A computer readable medium storing a program executed to process a first content and a second content that refers to and is different from the first content, the process comprising the steps of:

generating a secret key and a public key for the first content, adding the generated public key to the first content and transmitting the first content with the added public key, requesting an electronic signature produced by employing the secret key;

adding predetermined data incorporating said electronic signature to the second content, said predetermined data including a command to refer to the first content, and transmitting the second content to which said predetermined data is added, wherein said second content includes reference to said first content for use of said first content with said second content, and wherein the predetermined data includes first content insertion start position information and insertion end position information and second content reference start position information and reference end position information, thereby identifying portions of said first content to be used with a reference portion of said second content.

6. The computer readable medium according to claim 5, wherein the program performs the further steps of:

collating the electronic signature incorporated in the predetermined data by employing a public key that had been added to the first content when the transmitted second content is received, and processing and outputting the first content based on an instruction in the received second content when collation succeeds.

* * * * *